United States Patent [19]

van den Nieuwelaar et al.

[11] Patent Number: 5,041,054
[45] Date of Patent: Aug. 20, 1991

[54] DEVICE AND METHOD FOR WASHING POULTRY

[75] Inventors: Adrianus J. van den Nieuwelaar; Henricus F. J. M. van de Eerden, both of Gemert, Netherlands

[73] Assignee: Stork PMT B.V., The Hague, Netherlands

[21] Appl. No.: 592,526

[22] Filed: Oct. 4, 1990

[30] Foreign Application Priority Data

Oct. 6, 1989 [NL] Netherlands .................. 8902494

[51] Int. Cl.$^5$ .............................................. A22C 21/00
[52] U.S. Cl. ...................................... 452/123; 452/173
[58] Field of Search ................. 452/123, 173, 116, 117

[56] References Cited

U.S. PATENT DOCUMENTS

| | | | |
|---|---|---|---|
| 2,427,840 | 9/1947 | Davis | 45/173 |
| 2,613,391 | 10/1952 | Still | 452/173 |
| 2,795,817 | 6/1957 | Dahlberg | 452/116 |
| 3,803,669 | 4/1974 | Dillon | 452/173 |
| 4,024,603 | 5/1977 | Harben, Jr. et al. | 452/116 |
| 4,421,277 | 12/1983 | Tieleman | 239/456 |
| 4,557,016 | 12/1985 | Markert | 452/173 |

FOREIGN PATENT DOCUMENTS 7713912 6/1978 Netherlands .
8204143 5/1984 Netherlands .

Primary Examiner—Willis Little
Attorney, Agent, or Firm—Hurt, Richardson, Garner, Todd & Cadenhead

[57] ABSTRACT

An elongated washer for cleaning the inside of slaughtered, eviscerated poultry, comprising a spraying element to which cleaning liquid can be fed, and radially projecting parts, running mainly in the lengthwise direction, being disposed near the spraying element, which parts are provided with sharp projections. Preferably, the sharp projections run in the lengthwise direction. The projecting parts are advantageously plate-shaped and the radial dimensions thereof, viewed in the lengthwise direction, decrease from a central part towards both ends. In a method for cleaning birds using the washer the spraying element and the projecting parts are inserted through an opening near the anus of the bird and are moved in the direction of and through the neck part.

7 Claims, 2 Drawing Sheets

DEVICE AND METHOD FOR WASHING POULTRY

BACKGROUND OF THE INVENTION

The invention relates to an elongated washer for cleaning the inside of slaughtered, eviscerated poultry, comprising a spraying element to which cleaning liquid can be fed.

DISCUSSION OF THE PRIOR ART

During the slaughter of poultry, the birds are in succession stunned, bled, scalded (immersed in hot water for several minutes), plucked and eviscerated (removal of the viscera), following which the birds are sprayed with a cleaning liquid, not only on the outside, but also on the inside, in order to flush the carcass and the meat clean.

A washer for internal cleaning of poultry generally comprises a spraying element in which apertures are provided for spraying on virtually all sides, said spraying element being fitted on one end of a tube through which cleaning liquid can be supplied to the spraying element.

If the birds are being processed in a mechanized slaughterhouse, in which they are conveyed hanging by the legs through various processing stations, during the washing the washer is moved vertically downwards through the opening formed between the legs during eviscerating. When the spraying element is inside the bird, cleaning liquid is fed into it, so that the inside of the bird is washed. The liquid fed into the bird in this way leaves the body cavity through the neck opening obtained in preceding operations.

A source of problems in the cleaning is formed by the membranes left behind after eviscerating, i.e. air sacs and other membranes. The air sacs, which form part of the respiratory system, normally lie against the inside wall of the body cavity. After eviscerating, the membranes (in the earlier indicated vertical position of the birds) hang in the region of the neck, and can thereby impede the discharge of polluted cleaning liquid. There is also the chance of the membranes filling up with polluted cleaning liquid during washing, which then contaminates the body cavity for a longer period and is taken to further processing stations where it may cause contamination.

SUMMARY OF THE INVENTION

It is now the object of the invention to eliminate the above-mentioned problems by ensuring that all cleaning liquid used internally for washing can leave the birds. This object is attained according to the invention by a washer wherein radially projecting parts, running mainly in the lengthwise direction, are disposed near the spraying element, which parts are provided with sharp projections.

The sharp projections situated near the spraying element perforate and/or tear the membranes hanging in the neck region when the spraying element is put far enough into the bird.

This means that any cleaning liquid which has gone into the membranes cannot remain in the membranes, and leaves them through the openings formed. The projecting parts act as spacers here, so that openings for the discharge of cleaning liquid are kept open.

In order to prevent damage to the meat or the carcass, the sharp projections preferably run in the lengthwise direction of the washer.

For the same reason it is advantageous to make the projecting parts plate-shaped and to make the radial dimensions thereof decreasing in the lengthwise direction from a central part towards both ends. It is preferable here for the spraying element and the projecting parts on which the sharp projections are located to be inserted into the opening formed near the anus during eviscerating and to be moved in the direction of and through the neck part, so that torn-off membranes catching on the sharp projections are removed from the birds.

The other claims and advantages will be more readily appreciated as the same becomes better understood by reference to the following detailed description and considered in connection with the accompanying drawings in which like reference symbols designate like parts in the figures.

DESCRIPTION OF THE PREFERRED EMBODIMENTS

Figure 1:
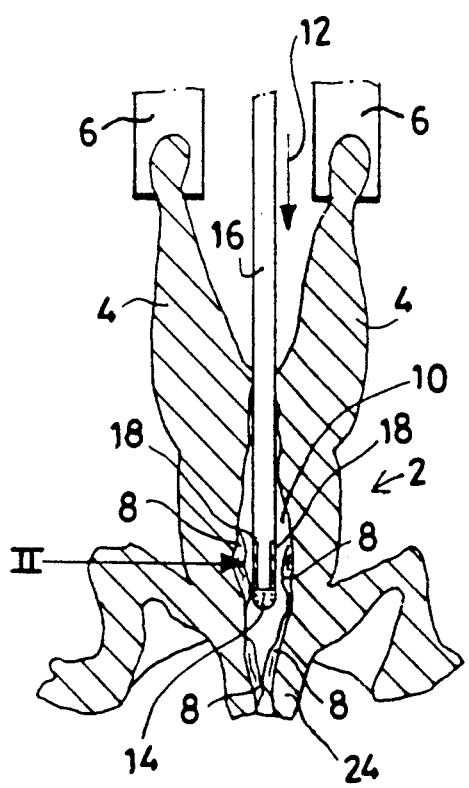
FIG. 1 shows a side view of a washer according to the invention in a bird shown in longitudinal section.
Figure 2:
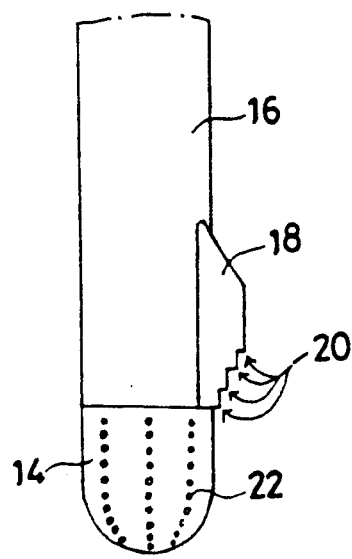
FIG. 2 shows on an enlarged scale a side view in the direction of arrow II of the washer of FIG. 1.

FIG. 1 shows a bird 2 suspended by the legs 4 from hooks 6. The viscera are removed from the bird 2, following which membranes 8 have been left behind in the body cavity 10. A washer is inserted between the legs in the direction of arrow 12 into the body cavity 10 of the bird 2, which washer comprises a spraying element 14 which is fixed to a hollow tube 16 through which cleaning liquid can be fed to the spraying element 14. The tube 16 is provided with two, in this case identical, plate-shaped projecting parts 18, in which sharp projections 20 in the form of steps are formed, as shown in FIG. 2. For cleaning of the body cavity, cleaning liquid is sprayed through apertures 22 in the spraying element 14. At the same time, the washer is moved in the direction of arrow 12 through the body cavity 10 and the neck part 24, in the process of which the membranes 8 catch on the sharp projections 20 and are thereby torn away from the inside wall of the body cavity 10, or are at least provided with such holes that cleaning liquid cannot accumulate therein.

Figure 3:
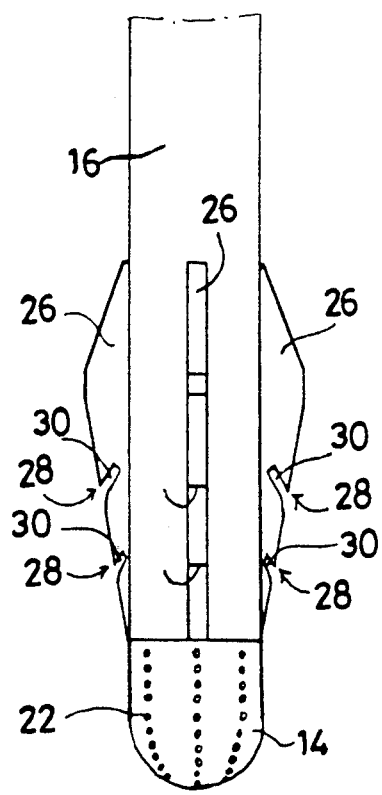
FIG. 3 shows a side view of another embodiment of the washer according to the invention.
Figure 4:
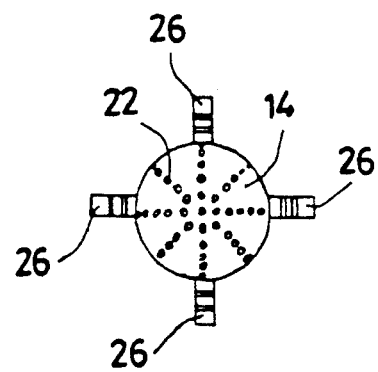
FIG. 4 shows a bottom view of the washer of FIG. 3.

FIGS. 3 and 4 show a similar washer to that of FIGS. 1 and 2, but with a modified shape of the projecting parts. Four plate-shaped projecting parts 26 are fitted around the tube 16, each part with two sharp projections 28, obtained by forming incisions 30 in the plate-shaped parts 26. These projections 28 fulfil the same function as that described with reference to the projections 20 in FIGS. 1 and 2.

Figure 5:
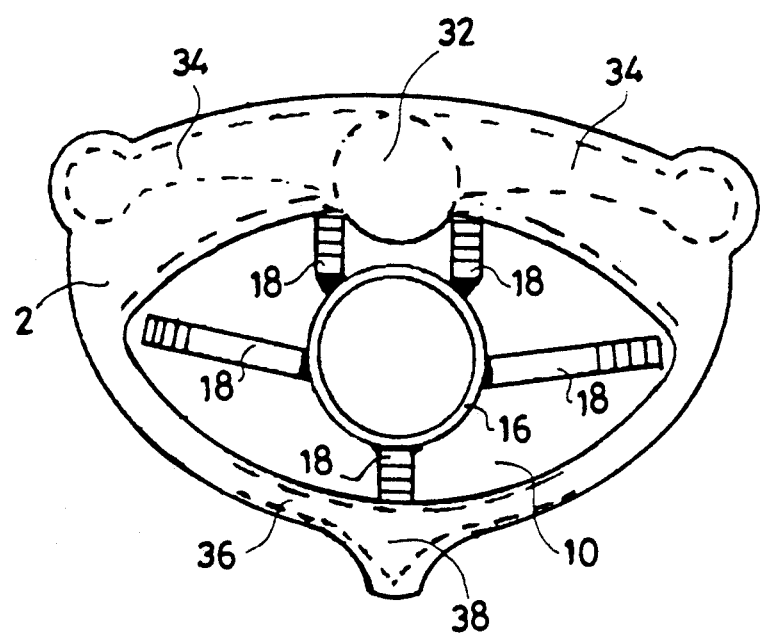
FIG. 5 shows a bottom view of a washer according to the invention, in a bird shown schematically in cross-section.

FIG. 5 shows a hollow tube 16, the corresponding spraying element of which is not shown. The plate-shaped projecting parts 18 are similarly shaped in the lengthwise direction as the projecting parts in FIG. 2.

The position of the parts 18 and the dimensions thereof are selected in such a way that the membranes are touched as much as possible and a good guidance in the body cavity 10 is obtained by making use of the spaces for passing of the spinal column 32, the shoulder/wing joints 34, the wishbone 36 and the breastbone 38. The sharp projections must be kept within the radial boundaries of the projecting parts 18, as a result of which the washer can be moved without risk of damage along the meat, in particular the M. coracobrachialis internus, and along the keelbone (on the inside of the breast cap) in the bod cavity.

What is claimed is:

1. An elongated washer for cleaning the inside of slaughtered, eviscerated poultry, comprising a spraying element to which cleaning liquid can be fed, wherein radially projecting parts, running mainly in the lengthwise direction, are disposed near the spraying element, which parts are provided with sharp projections.

2. A washer according to claim 1, wherein the sharp projections run in the lengthwise direction.

3. A washer according to claim 1, wherein the projecting parts are plate-shaped and the radial dimensions thereof, viewed in the lengthwise direction, decrease from a central part towards both ends.

4. A washer according to claim 3, wherein the projecting parts at the side thereof decreasing in the radial direction which is at the front when the washer is being inserted into the bird have one or more step-shaped sharp projections.

5. A washer according to claim 3, wherein the projecting parts at the side thereof decreasing in the radial direction which is at the front when the washer is being inserted into the bird have one or more mainly rectangular incisions which are directed at an acute angle relative to the longitudinal axis of the washer and form sharp projections in the projecting parts.

6. A washer according to claim 3, wherein the washer comprises five projecting parts, the first projecting part being intended for moving along the breastbone, the second and third projecting parts lying diametrically opposite the first projecting part and being intended for moving on either side along the spinal column, and the fourth and fifth projecting parts lying essentially at right angles to the above-mentioned projecting parts, and being intended for moving along the shoulder/wing joints.

7. A method for cleaning the inside of slaughtered, eviscerated poultry using an elongated washer, comprising a spraying element to which cleaning liquid can be fed, wherein radially projection parts, running mainly in the lengthwise direction, are disposed near the spraying element, which parts are provided with sharp projections, the method comprising the steps of inserting the spraying element and the projecting parts through an opening near the anus of the bird and moving them in the direction of and through the neck part.

* * * * *